(12) United States Patent
Toshioka et al.

(10) Patent No.: US 8,225,596 B2
(45) Date of Patent: Jul. 24, 2012

(54) EXHAUST PURIFICATION DEVICE OF INTERNAL COMBUSTION ENGINE

(75) Inventors: Shunsuke Toshioka, Susono (JP); Tomihisa Oda, Numazu (JP); Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 368 days.

(21) Appl. No.: 12/450,276

(22) PCT Filed: Mar. 4, 2008

(86) PCT No.: PCT/JP2008/054241
§ 371 (c)(1),
(2), (4) Date: Sep. 18, 2009

(87) PCT Pub. No.: WO2009/110102
PCT Pub. Date: Sep. 11, 2009

(65) Prior Publication Data
US 2010/0031642 A1 Feb. 11, 2010

(51) Int. Cl.
*F01N 3/00* (2006.01)
(52) U.S. Cl. ............... 60/281; 60/285; 60/287
(58) Field of Classification Search .......... 60/284, 60/285, 286, 288, 295, 301
See application file for complete search history.

(56) References Cited

U.S. PATENT DOCUMENTS

| 5,628,186 | A | 5/1997 | Schmelz |
| 6,209,317 | B1 * | 4/2001 | Hirota ........................ 60/297 |
| 6,725,651 | B2 * | 4/2004 | Itoh et al. ...................... 60/286 |
| 2002/0056273 | A1 | 5/2002 | Itoh et al. |
| 2003/0077212 | A1 | 4/2003 | Hammer |
| 2006/0053778 | A1 | 3/2006 | Asanuma et al. |
| 2009/0056314 | A1 * | 3/2009 | Gabe et al. ..................... 60/278 |
| 2010/0050610 | A1 * | 3/2010 | Toshioka et al. ............... 60/286 |

FOREIGN PATENT DOCUMENTS

| EP | 0 952 320 A2 | 10/1999 |
| EP | 1 106 799 A1 | 6/2001 |
| JP | A-07-011947 | 1/1995 |
| JP | A-08-509795 | 10/1996 |
| JP | A-11-324661 | 11/1999 |
| JP | A-2002-188429 | 7/2002 |
| JP | A-2002-242664 | 8/2002 |
| JP | A-2003-220339 | 8/2003 |
| JP | A-2003-531721 | 10/2003 |

(Continued)

OTHER PUBLICATIONS

Japanese Office Action issued in Japanese Patent Application No. 2006-306369 and mailed on Feb. 23, 2010 (with language English-translation).

(Continued)

*Primary Examiner* — Thomas Denion
*Assistant Examiner* — Patrick Maines
(74) *Attorney, Agent, or Firm* — Oliff & Berridge, PLC

(57) ABSTRACT

In an internal combustion engine, a urea adsorption type selective reduction catalyst is arranged in an engine exhaust passage. By feeding urea from a urea feed valve into the exhaust gas flowing into this selective reduction catalyst, the NOx included in the exhaust gas is reduced in the selective reduction catalyst. TO suppress the generation of hydrogen cyanide, an HC adsorption catalyst for adsorption of the HC in the exhaust gas is arranged in the engine exhaust passage upstream of the selective reduction catalyst.

9 Claims, 9 Drawing Sheets

FOREIGN PATENT DOCUMENTS

| | | |
|---|---|---|
| JP | A-2004-097900 | 4/2004 |
| JP | A-2004-511691 | 4/2004 |
| JP | 2006177346 A * | 7/2006 |
| JP | A-2006-177346 | 7/2006 |
| JP | A-2006-291930 | 10/2006 |
| JP | A-2007-239500 | 9/2007 |
| WO | WO 99/67511 A1 | 12/1999 |

OTHER PUBLICATIONS

Supplementary European Search Report mailed Apr. 26, 2011 for European Patent Application No. EP 08 72 1657.

* cited by examiner

Fig.1
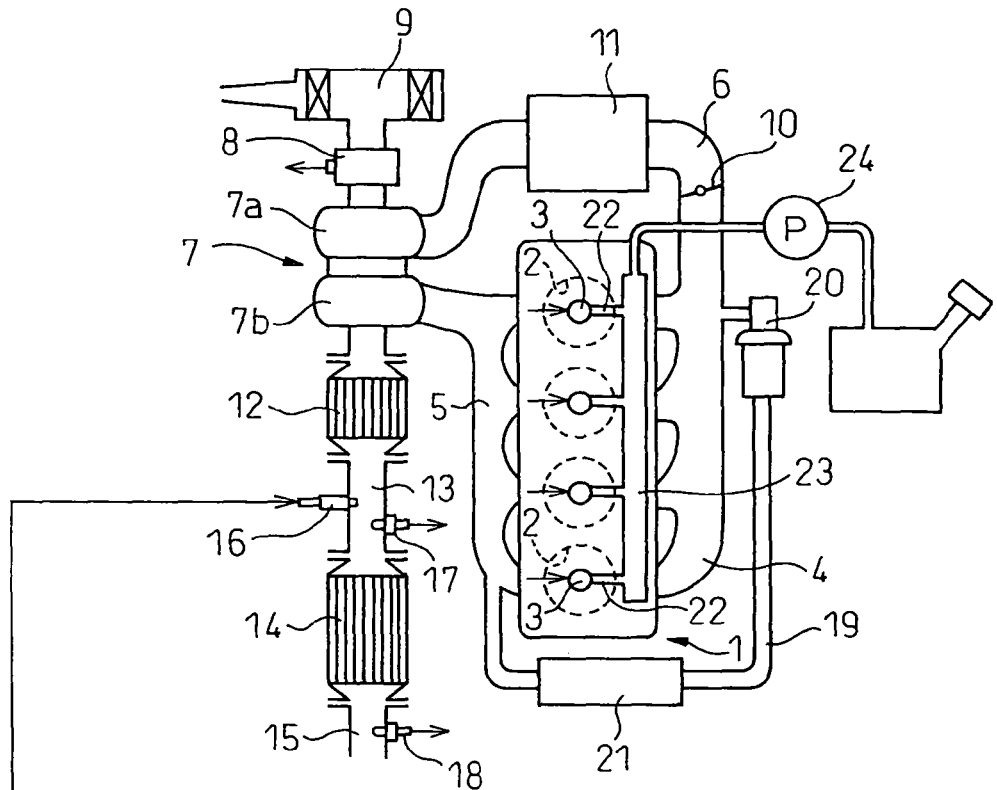
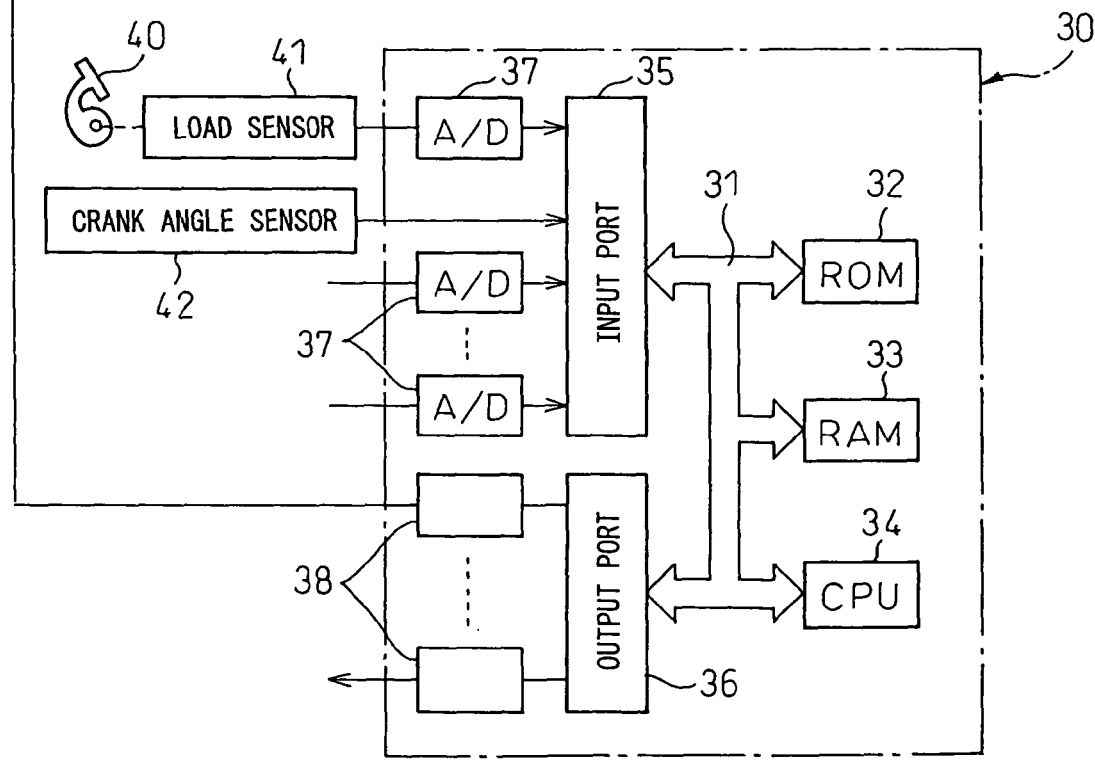

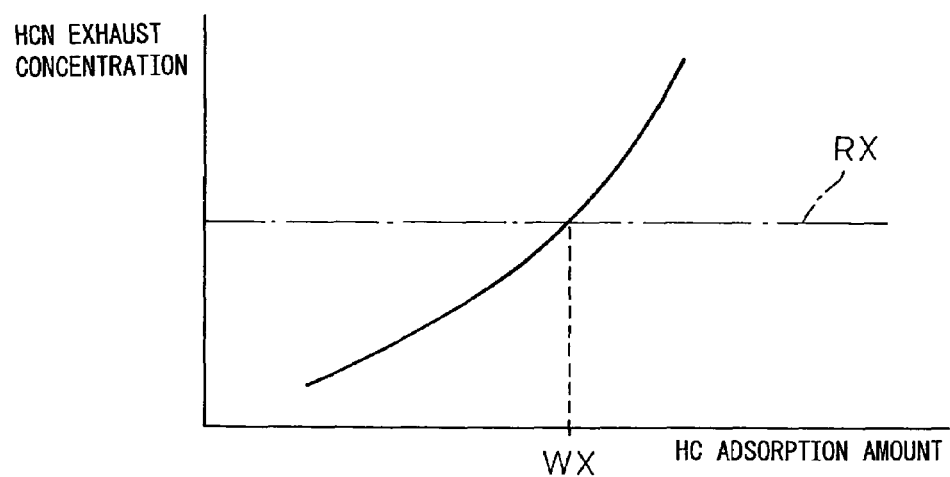
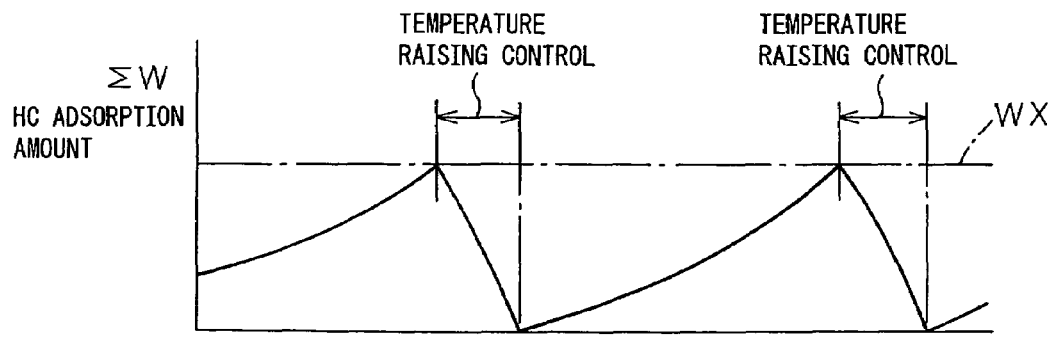

Fig.6
(A)
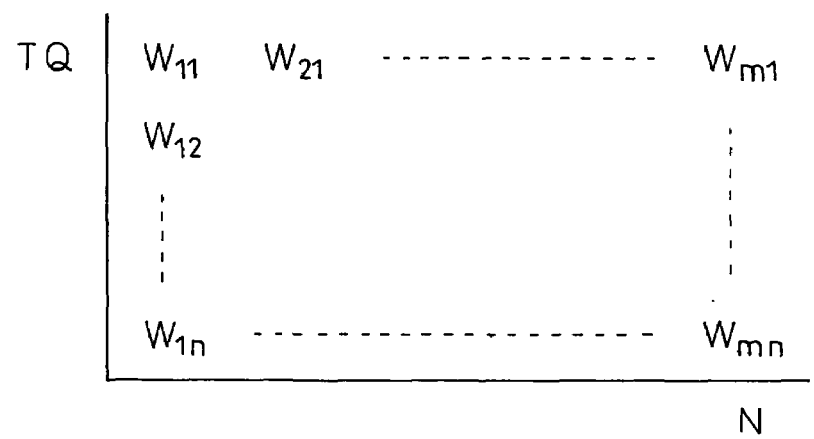
(B)
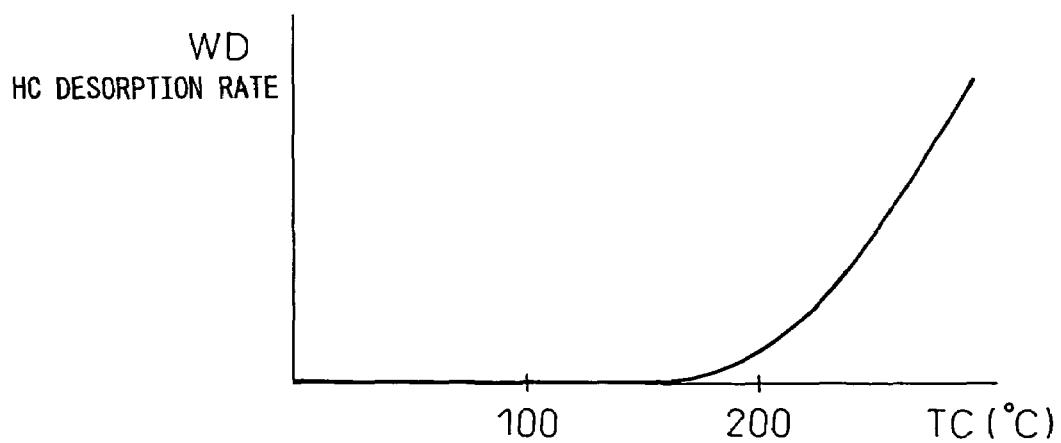

Fig.8
(A)
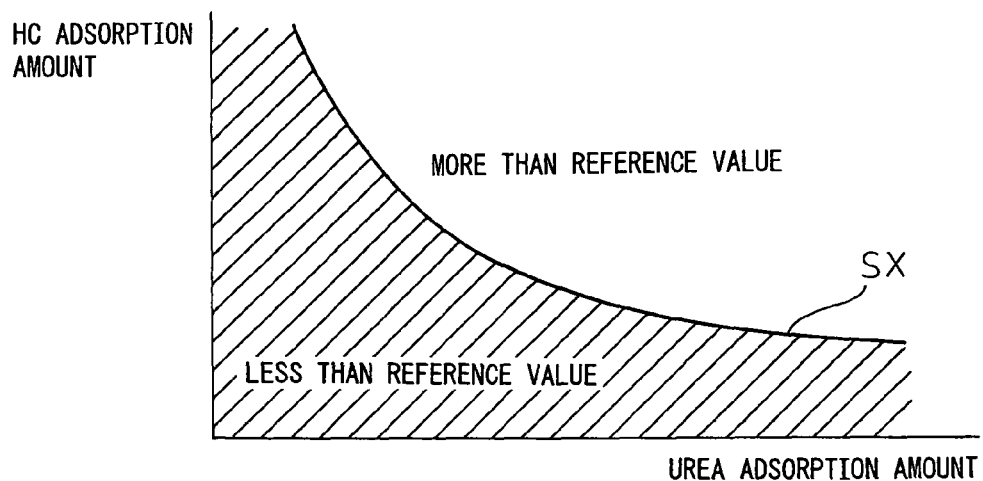
(B)
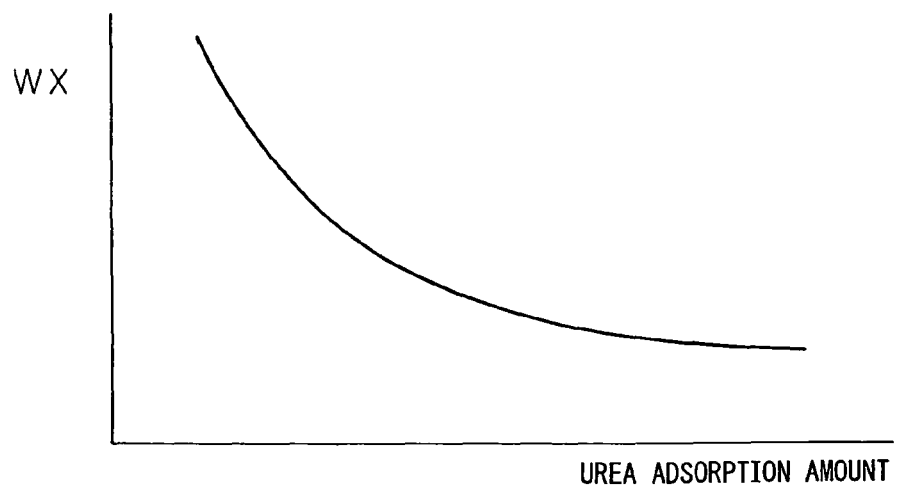

Fig.10
(A)
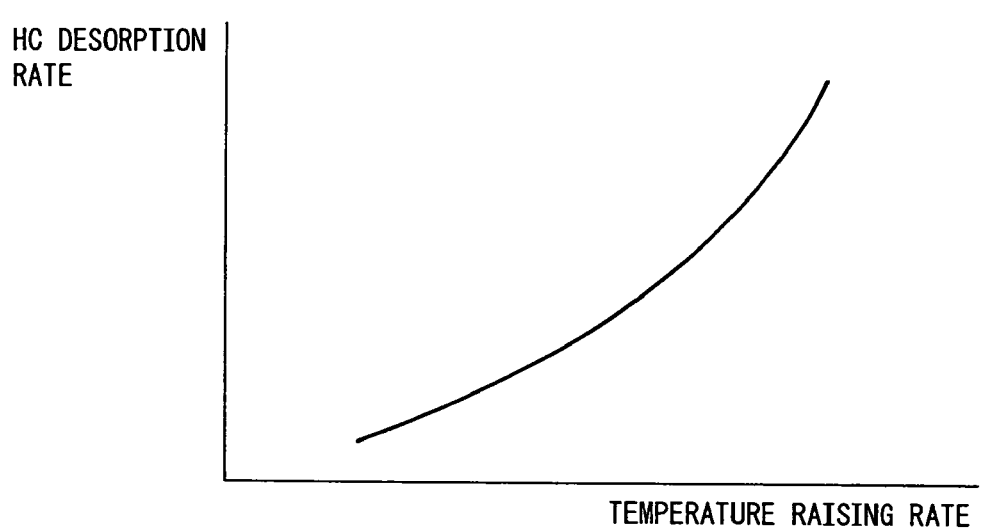
(B)
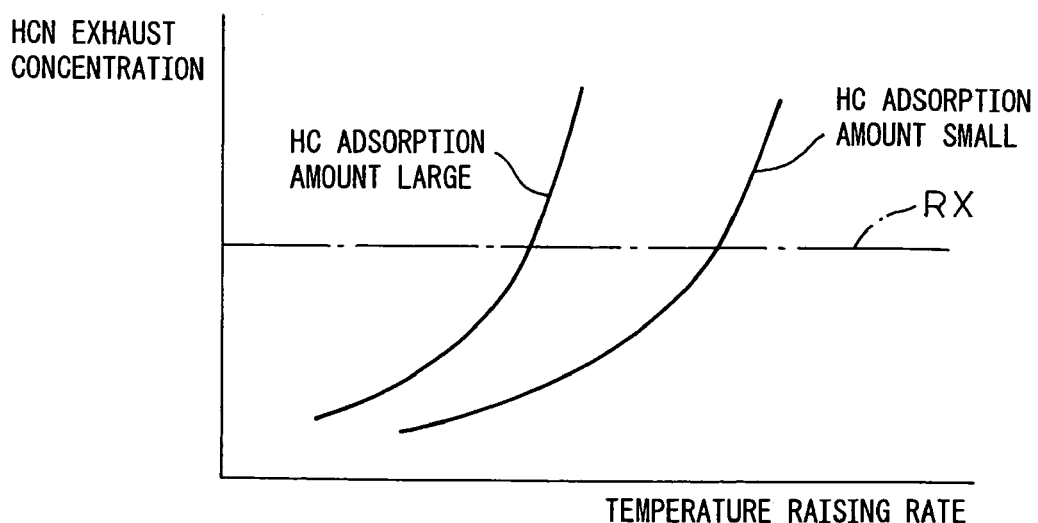

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging a particulate filter carrying a catalyst in an engine exhaust passage, arranging a selective reduction catalyst in the exhaust passage downstream of the particulate filter, and feeding urea into the exhaust passage upstream of the particulate filter (for example, see Japanese Patent Publication (A) No. 2004-511691). In this internal combustion engine, when the catalyst carried on the particulate filter is activated, the unburned HC and CO contained in the exhaust gas are removed by oxidation at the particulate filter and the particulate contained in the exhaust gas is burned off on the particulate filter. Furthermore, in this internal combustion engine, the $NO_x$ contained in the exhaust gas is reduced on the selective reduction catalyst by the urea fed into the exhaust passage.

However, if urea is fed into the engine exhaust passage in this way, the intermediate product derived from this urea will react the unburned HC contained in the exhaust gas and produce harmful hydrogen cyanide HCN. In this case, when a large amount of unburned HC is exhausted from the engine such as particularly at the time of engine cold start, and at the instant when the unburned HC in the exhaust gas increases during vehicle operation, a large amount of hydrogen cyanide will be produced. As a result, the problem arises of a large amount of hydrogen cyanide HCN exceeding the allowable concentration being exhausted into the atmosphere.

DISCLOSURE OF THE INVENTION

An object of the present invention is to provide an exhaust purification device of an internal combustion engine able to suppress the exhaust of hydrogen cyanide into the atmosphere.

According to the present invention, there is provided an exhaust purification device of internal combustion engine arranging a urea adsorption type selective reduction catalyst in an engine exhaust passage and feeding urea into exhaust gas flowing into the selective reduction catalyst so as to reduce $NO_x$ contained in the exhaust gas in the selective reduction catalyst, wherein an HC adsorption catalyst for adsorbing HC in the exhaust gas is arranged in the engine exhaust passage upstream of the selective reduction catalyst so as to suppress the generation of hydrogen cyanide.

BRIEF DESCRIPTION OF THE DRAWINGS

FIG. 1 is an overview of an internal combustion engine, FIG. 4 is a view of the relationship between the HCN exhaust rate and HC adsorption amount, FIG. 5 is a time chart showing the temperature raising control, FIG. 6 is a view showing a map of the $NO_x$ adsorption amount W etc., FIG. 8 is a view showing regions where the HCN exhaust concentration becomes more than the reference value and becomes less than the reference value, FIG. 10 is a view showing the relationship of the temperature raising rate and HC desorption rate etc.

BEST MODE FOR CARRYING OUT THE INVENTION

Figure 2:
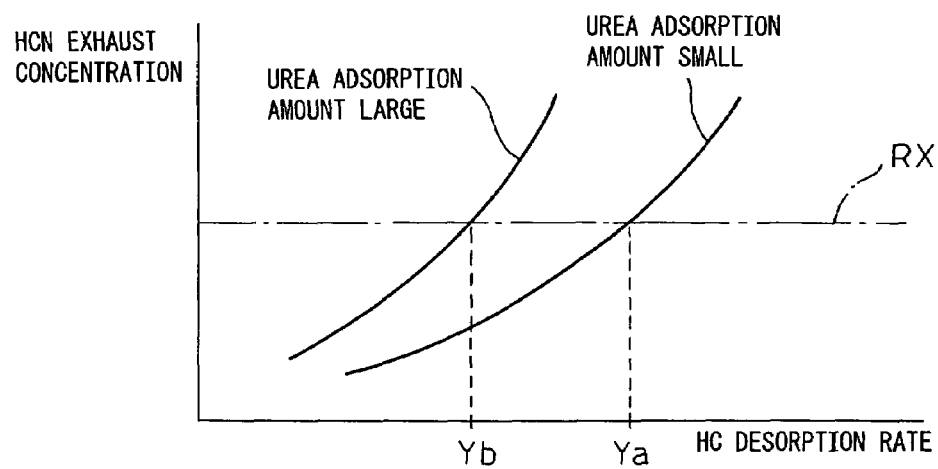
FIG. 2 is a view showing the relationship between the HCN exhaust concentration and the HC desorption rate.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an air flow meter 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of a HC adsorption catalyst 12. The outlet of the HC adsorption catalyst 12 is connected to the inlet of a urea adsorption type selective reduction catalyst 14 via an exhaust pipe 13, and the outlet of the selective reduction catalyst 14 is connected to an exhaust pipe 15. A urea feed valve 16 for feeding a urea to the selective reduction catalyst 14 is arranged in the exhaust pipe 13, and an aqueous urea solution containing a urea therein is injected into the exhaust gas from the urea feed valve 16. In addition, temperature sensors 17, 18 for detecting the temperature of the exhaust gas are arranged in the exhaust pipes 13, 15, respectively.

The exhaust manifold 5 and the intake manifold 4 are connected to each other through an exhaust gas recirculation (hereinafter referred to as the "EGR") passage 19. Inside the EGR passage 19 is arranged an electronic control type EGR control valve 20. Further, around the EGR passage 19 is arranged a cooling device 21 for cooling the EGR gas flowing through the inside of the EGR passage 19. In the embodiment shown in FIG. 1, the engine cooling water is guided through the cooling device 21, where the engine cooling water is used to cool the EGR gas. On the other hand, each fuel injector 3 is connected through a fuel feed pipe 22 to a common rail 23. Fuel is fed into the common rail 23 from an electronically controlled variable discharge fuel pump 24, and the fuel fed into the common rail 23 is fed through each fuel pipe 22 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. The output signal of the air flow meter 8 and the output signals of the temperature sensors 17, 18 are input through corresponding AD converters 37 into the input port 35. The accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crank shaft rotates by for example 15° C. connected to it. On the other hand, the output port 36 is connected through corresponding drive circuits 38 to the fuel injectors 3, throttle valve 10 drive step motor, urea feed valve 16, EGR control valve 20, and fuel pump 24.

The selective reduction catalyst 14 is for example comprised of zeolite having a transition metal. In the embodiment shown in FIG. 1, the selective reduction catalyst 14 is comprised of Fe-zeolite. When aqueous urea solution is fed from the urea feed valve 16, the majority of the urea in the aqueous urea solution is adsorbed at the selective reduction catalyst 14. The adsorbed urea generates ammonia $NH_3$ while changing form, that is, while changing to an intermediate product. The $NO_x$ contained in the exhaust gas is reduced by reacting with the ammonia $NH_3$ produced on the selective reduction catalyst 14. In the embodiment according to the present invention, the aqueous urea solution is fed from the urea feed valve 16 so that the amount of urea adsorption adsorbed at the selective reduction catalyst 14 becomes a sufficient amount for reducing the $NO_x$.

In this regard, when unburned HC flows into the selective reduction catalyst 14 at which urea has been adsorbed in this way, intermediate products derived from urea generated in the selective reduction catalyst 14 react with the unburned HC whereby harmful hydrogen cyanide HCN is generated. In this case, when the amount of hydrogen cyanide HCN produced is small and thus the concentration of hydrogen cyanide HCN in the exhaust gas exhausted into the air is low, there is no particular problem.

However, when a large amount of unburned HC is sent into the selective reduction catalyst 14, a large amount of hydrogen cyanide HCN is produced and the concentration of hydrogen cyanide HCN exhausted into the atmosphere ends up exceeding the allowable concentration, that is, a predetermined reference value. Therefore, in the present invention, to remove the unburned HC contained in the exhaust gas flowing into the selective reduction catalyst 14 by adsorption, an HC adsorption catalyst 12 is arranged upstream of the selective reduction catalyst 14.

In the embodiment according to the present invention, this HC adsorption catalyst 12 is comprised of zeolite. This zeolite has the function of adsorbing the unburned HC even when the temperature of the zeolite is low such as at the time of engine cold start. Therefore, even when a large amount of unburned HC is exhausted from the engine such as at the time of engine cold start, the unburned HC is adsorbed by the HC adsorption catalyst 12 and therefore a large amount of hydrogen cyanide HCN can be prevented from being exhausted into the atmosphere.

Note that this HC adsorption catalyst 12 may also, for example, carry an oxidation catalyst comprised of platinum Pt. In this case, when the oxidation catalyst is not activated, the majority of the unburned HC in the exhaust gas is adsorbed at the HC adsorption catalyst 12. When the oxidation catalyst is activated, the majority of the unburned HC in the exhaust gas is oxidized. Therefore, in this case, both when the oxidation catalyst is not activated or is activated, inflow of a large amount of unburned HC to the selective reduction catalyst 14 is prevented.

In this regard, it is substantially almost impossible to completely prevent hydrogen cyanide HCN from being exhausted into the atmosphere. If considering social demands, it is sufficient to suppress the concentration of the hydrogen cyanide HCN exhausted into the atmosphere to the allowable concentration, that is, a predetermined reference value or less. Therefore, if it were possible to suppress the concentration of hydrogen cyanide HCN exhausted into the atmosphere to the reference value or less, it would also be possible to desorb the adsorbed HC from the HC adsorption catalyst 12. Below, the relationship between this HC desorption action and the concentration of hydrogen cyanide HCN exhausted into the atmosphere will be explained.

FIG. 2 shows the relationship between the HC desorption rate (weight/unit time) from the HC adsorption catalyst 12 and the concentration of hydrogen cyanide HCN in the exhaust gas flowing out from the selective reduction catalyst 14, that is, the exhaust concentration of the hydrogen cyanide HCN exhausted into the atmosphere. Note that FIG. 2 shows the two relationships of the HC desorption rate and HCN exhaust concentration for the case where the amount of urea adsorption at the selective reduction catalyst 14 is large and the case where it is small.

The higher the HC desorption rate, the greater the amount of HC desorbed from the HC adsorption catalyst 12 per unit time, so, as shown in FIG. 2, regardless of the magnitude of the urea adsorption amount, the higher the HC desorption rate, the higher the HCN exhaust concentration. Further, even if the HC desorption rate is the same, the larger the urea adsorption amount, the higher the HCN exhaust concentration. Therefore, as shown in FIG. 2, the curve showing when the urea adsorption amount is large is positioned above the curve showing when the urea adsorption amount is small.

On the other hand, FIG. 2 shows the allowable concentration of the HCN exhaust concentration, that is, the reference value RX. From FIG. 2, it is learned that when the urea adsorption amount is small, if making the HC desorption rate less than Ya, the HCN exhaust concentration will become less than the reference value RX, while when the urea adsorption amount is large, if making the HC desorption rate less than Yb, the HCN exhaust concentration will become less than the reference value RX. Therefore, in the present invention, the HC desorption rate from the HC adsorption catalyst 12 is suppressed so that the hydrogen cyanide concentration in the exhaust gas flowing out from the selective reduction catalyst 14 becomes less than the predetermined reference value RX.

Figure 3:
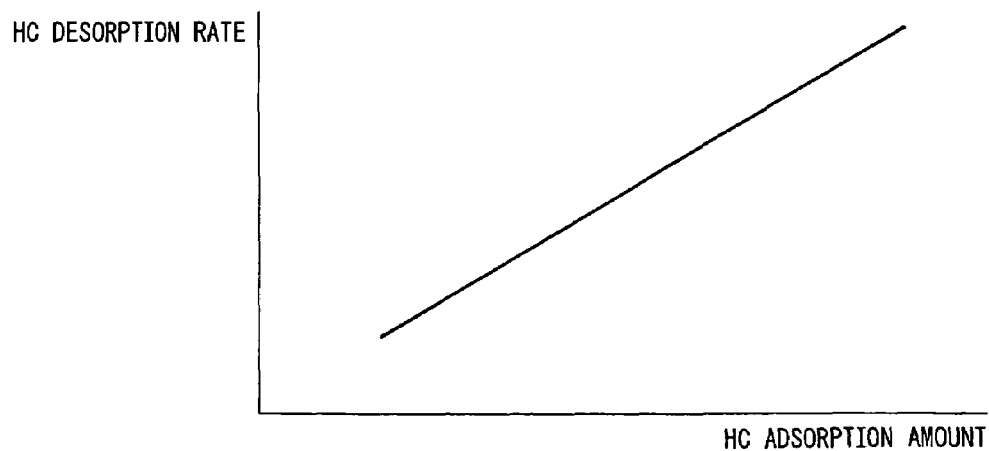
FIG. 3 is a view showing the relationship between the HC desorption rate and the HC adsorption amount.

In this regard, between the HC desorption rate and HC adsorption amount, as shown in FIG. 3, there is the relationship that the greater the HC adsorption amount, the higher the HC desorption rate. Therefore, if the urea adsorption amount is constant, as shown in FIG. 4, the greater the HC adsorption amount, the higher the HCN exhaust concentration. Therefore, in the case shown in FIG. 4, it is learned that when the HC adsorption amount is less than WX, if HC is made to desorb from the HC adsorption catalyst 12, the HCN exhaust concentration will fall to less than the reference value RX. Therefore, in one embodiment according to the present invention, when the HC adsorption amount is less than the allowable HC adsorption amount WX, an HC desorption action from the HC adsorption catalyst 12 is performed.

In this regard, if raising the temperature of the HC adsorption catalyst 12, the HC desorption action from the HC adsorption catalyst 12 is started. Therefore, in an embodiment according to the present invention, when HC should be desorbed from the HC adsorption catalyst 12, the HC adsorption catalyst 12 is raised in temperature. The temperature raising control of the HC adsorption catalyst 12 is performed by for example retarding the injection timing to raise the exhaust gas temperature or by injecting additional fuel into the expansion stroke to raise the exhaust gas temperature.

Summarizing the above, in an embodiment of the present invention, as the amount of HC able to be adsorbed by the HC adsorption catalyst 12, the allowable HC adsorption amount WX where the hydrogen cyanide concentration in the exhaust gas flowing out from the selective reduction catalyst 14 becomes less than the reference value RX when the HC is desorbed from the HC adsorption catalyst 12 is found in advance. When the amount of adsorption of HC at the HC adsorption catalyst 12 is less than the allowable HC adsorption amount WX, the temperature raising action of the HC adsorption catalyst 12 is performed for making the HC desorb from the HC adsorption catalyst 12. In this case, in the example shown in FIG. 4, the allowable HC adsorption amount RX is made a constant value.

FIG. 5 shows an example of HC desorption control. In this example, temperature raising control of the HC adsorption catalyst 12 is performed every time the HC adsorption amount $\Sigma W$ of the HC adsorption catalyst 12 reaches the allowable HC adsorption amount WX, whereby the HC is desorbed from the HC adsorption catalyst 12. Note that in the example shown in FIG. 5, the HC adsorption amount $\Sigma W$ is calculated by cumulatively adding the HC adsorption amount W per unit time. This HC adsorption amount W per unit time is found in advance by experiments and is stored as a function of the required torque TQ and engine speed N in the form of the map shown in FIG. 6(A) in advance in the ROM 32.

On the other hand, the HC desorption rate WD from the HC adsorption catalyst 12, as shown in FIG. 6(B), is a function of the temperature TC of the HC adsorption catalyst 12. When the temperature TC of the HC adsorption catalyst 12 exceeds the desorption start temperature, the HC desorption rate WD rapidly rises. The amount of reduction of the HC adsorption amount $\Sigma W$ at the time of the temperature raising control shown in FIG. 5 is calculated using the HC desorption rate WD shown in FIG. 6(B). Note that the HC adsorption amount $\Sigma W$ of the HC adsorption catalyst 12 can also be found from the temperature history of the HC adsorption catalyst 12, the running distance of the vehicle, the detection value of the HC concentration in the exhaust gas flowing out from the HC adsorption catalyst 12, etc.

Figure 7:
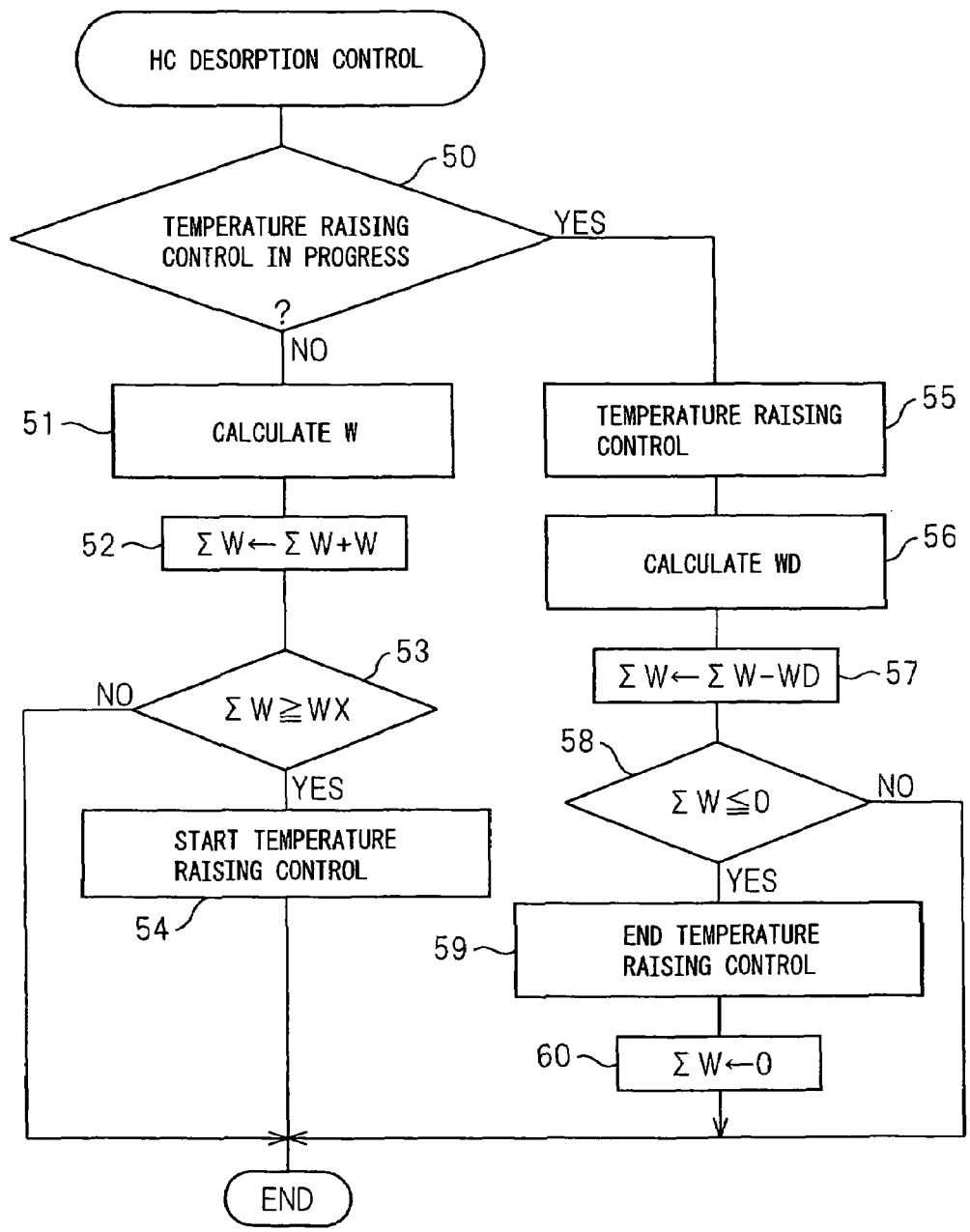
FIG. 7 is a flowchart of HC desorption control.

FIG. 7 shows the routine for desorption control of HC.

Referring to FIG. 7, first, at step 50, it is judged if temperature raising control of the HC adsorption catalyst 12 is in progress. Usually, temperature raising control is not in progress, so the routine proceeds to step 51 where the HC adsorption amount W per unit time is calculated from the map shown in FIG. 6(A). Next, at step 52, the HC adsorption amount W is added to the HC adsorption amount $\Sigma W$. Next, at step 53, it is judged if the HC adsorption amount $\Sigma W$ has become larger than the allowable HC adsorption amount WX. When the $NO_x$ adsorption amount $\Sigma W$ becomes larger than the allowable HC adsorption amount WX, the routine proceeds to step 54 where the temperature raising control of the HC adsorption catalyst 12 is started.

When the temperature raising control is started, the routine proceeds from step 50 to step 55 where the temperature raising control is continued. At step 56, the HC desorption rate WD is calculated from the relationship shown in FIG. 6(B) based on the temperature TC of the HC adsorption catalyst 12 estimated from the temperature detected by the temperature sensor 17. Next, at step 57, the HC desorption rate WD expressing the HC desorption amount per unit time is subtracted from the HC adsorption amount $\Sigma W$. Next, at step 58, it is judged if the HC adsorption amount $\Sigma W$ has become zero or negative. When $\Sigma W \leq 0$, the routine proceeds to step 59, where the temperature raising control is ended, then, at step 60, $\Sigma W$ is cleared.

As explained above, FIG. 4 shows the reference value RX when the urea adsorption amount is made constant. As opposed to this, the boundary SX between the region where the HCN exhaust concentration becomes less than the reference value RX and the region where it becomes more than the reference value RX when considering the urea adsorption amount is shown in FIG. 8(A). As will be understood from FIG. 2, the greater the urea adsorption amount, the smaller the HC desorption rate when the HCN exhaust concentration becomes the reference value RX, that is, the HC adsorption amount. Therefore, the region of the urea adsorption amount and HC adsorption amount where the HCN exhaust concentration becomes less than the reference value RX becomes the region shown by the hatching in FIG. 8(A).

In this regard, the limit of the HC adsorption amount where the HCN exhaust concentration will not become more than the reference value at the time of a certain urea adsorption amount in FIG. 8(A) is the boundary SX. Therefore, this boundary SX corresponds to the allowable HC adsorption amount WX. Therefore, when considering the urea adsorption amount, as shown in FIG. 8(B), the allowable HC adsorption amount WX becomes smaller the greater the amount of urea adsorbed at the selective reduction catalyst 14. In this embodiment, the temperature raising action of the HC adsorption catalyst 12 is performed when the HC adsorption amount reaches the allowable HC adsorption amount WX shown in FIG. 8(B).

Figure 9:
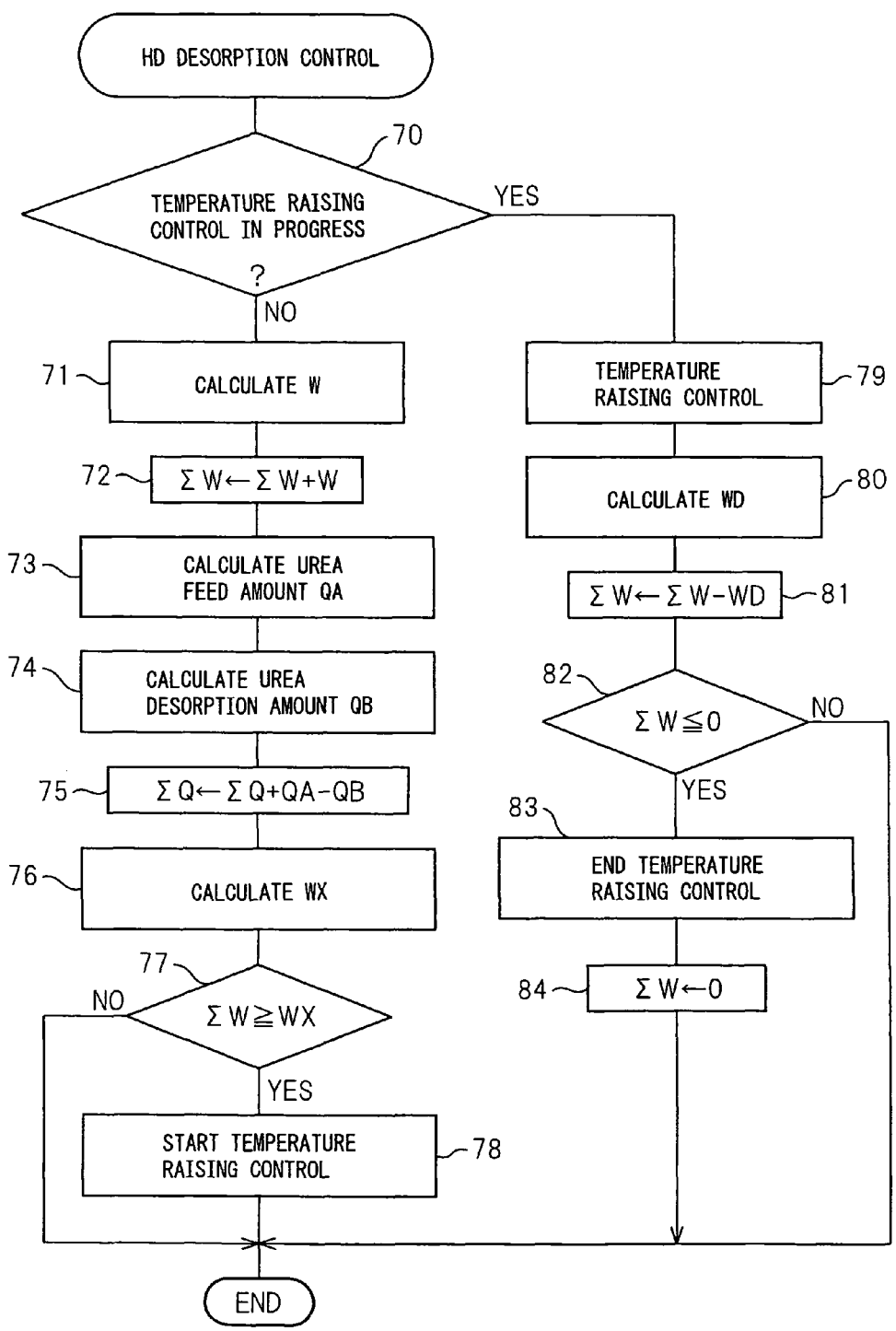
FIG. 9 is a flowchart for HC desorption control.

FIG. 9 shows a routine for desorption control of HC.

Referring to FIG. 9, first, at step 70, it is judged if temperature raising control of the HC adsorption catalyst 12 is in progress. Usually, the temperature raising control is not in progress, so the routine proceeds to step 71 where the HC adsorption amount W per unit time is calculated from the map shown in FIG. 6(A). Next, at step 72, the HC adsorption amount W is added to the HC adsorption amount $\Sigma W$. Next, at step 73, the urea feed amount QA fed from the urea feed valve 16 is calculated.

Next, at step 74, the $NO_x$ exhaust amount from the engine in accordance with the operating state of the engine is found, and the urea desorption amount QB desorbed for reducing this $NO_x$ is calculated. Next, at step 75, the urea feed amount QA is added to the urea adsorption amount $\Sigma Q$ and the urea desorption amount QB is subtracted from the urea adsorption amount $\Sigma Q$. Next, at step 76, based on this urea adsorption amount $\Sigma Q$, the allowable HC adsorption amount WX is calculated from FIG. 8(B). Next, at step 77, it is judged if the $NO_x$ adsorption amount $\Sigma W$ has become larger than the allowable HC adsorption amount WX. When the $NO_x$ adsorption amount $\Sigma W$ becomes larger than the allowable HC adsorption amount WX, the routine proceeds to step 78 where temperature raising control of the HC adsorption catalyst 12 is started.

When the temperature raising control is started, the routine proceeds from step 70 to step 79, where temperature raising control is continued. At step 80, the HC desorption rate WD is calculated from the relationship shown in FIG. 6(B) based on the temperature TC of the HC adsorption catalyst 12 estimated from the temperature detected by the temperature sensor 17. Next, at step 81, the HC desorption rate WD is subtracted from the HC adsorption amount $\Sigma W$. Next, at step 82, it is judged if the HC adsorption amount $\Sigma W$ has become zero or negative. When $\Sigma W \leq 0$, the routine proceeds to step 83, where temperature raising control is ended, then at step 84, $\Sigma W$ is cleared.

Figure 11:
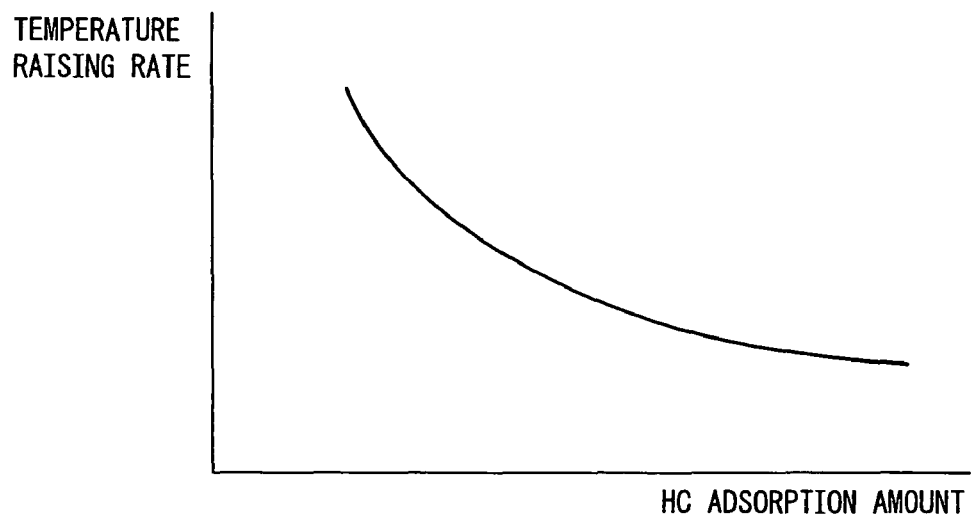
FIG. 11 is a view showing the relationship of the temperature raising rate and HC adsorption amount.

Next, still another embodiment will be explained with reference to FIGS. 10(A) and (B) and FIG. 11.

As explained with reference to FIG. 6(B), the HC desorption rate rises rapidly when the temperature TC of the HC adsorption catalyst 12 exceeds the desorption start temperature, therefore, as shown in FIG. 10(A), the HC desorption rate becomes higher the higher the temperature raising rate of the HC adsorption catalyst 12. Therefore, if changing the abscissa of FIG. 2 to the temperature raising rate, the HCN exhaust concentration and temperature raising rate become the relationship shown in FIG. 10(B). However, FIG. 10(B), unlike FIG. 2, shows the two relationships of the HCN exhaust concentration and temperature raising rate for the case where the HC adsorption amount is large and the case where it is small.

As will be understood from FIG. 10(B), the temperature raising rate when the HCN exhaust concentration becomes the reference value RX becomes lower the greater the HC adsorption amount. That is, to maintain the HCN exhaust concentration at the reference value RX or less, it is necessary to lower the temperature raising rate the higher the HC adsorption amount. Therefore, in this embodiment, at the time of the temperature raising control at step 55 of FIG. 7 or step 79 of FIG. 9, the greater the HC adsorption amount to the HC adsorption catalyst 12 at the time of start of temperature raising control of the HC adsorption catalyst 12 shown in FIG. 11, the lower the temperature raising rate is made.

Figure 12:
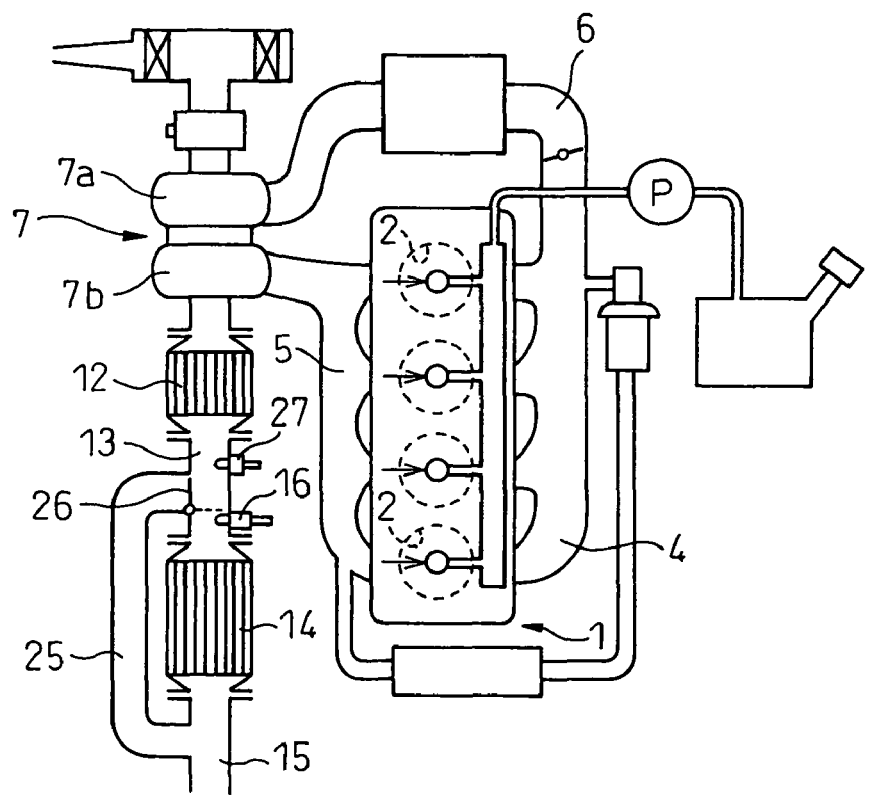
FIG. 12 is an overview showing another embodiment of an internal combustion engine.

FIG. 12 shows still another embodiment. In this embodiment, a bypass passage 25 bypassing the selective reduction catalyst 14 and extending to the exhaust pipe 15 is branched from the exhaust pipe 13 between the HC adsorption catalyst 12 and the selective reduction catalyst 14. A flow switching valve 26 is arranged at the branching part of this bypass passage 25. Further, inside the exhaust pipe 13, an HC concentration sensor 27 is arranged for detecting the concentration of unburned HC in the exhaust gas flowing out from the HC adsorption catalyst 12.

In this embodiment, when the HC concentration in the exhaust gas flowing out from the HC adsorption catalyst 12 is less than a predetermined allowable concentration, the flow switching valve 26 is held at the position shown by the solid line in FIG. 12. Therefore, at this time, the exhaust gas flowing out from the HC adsorption catalyst 12 is sent into the selective reduction catalyst 14. As opposed to this, when the HC concentration in the exhaust gas flowing out from the HC adsorption catalyst 12 becomes more than the predetermined allowable concentration, the flow switching valve 26 is switched to the position shown by the broken line in FIG. 12. Therefore, at this time, the exhaust gas is sent into the bypass passage 25 and thereby the generation of hydrogen cyanide HCN is prevented.

LIST OF REFERENCE NUMERALS

5 . . . exhaust manifold
7 . . . turbocharger
12 . . . HC adsorption catalyst
14 . . . selective reduction catalyst
16 . . . urea feed valve

The invention claimed is:

1. An exhaust purification device of an internal combustion engine, the device comprising:
   a urea adsorption type selective reduction catalyst configured to reduce NOx in an exhaust gas, the urea adsorption type selective reduction catalyst disposed in an engine exhaust passage;
   an HC adsorption catalyst for adsorbing HC in the exhaust gas, the HC adsorption catalyst disposed in the engine exhaust passage upstream of the urea adsorption type selective reduction catalyst;
   a urea feed valve configured to feed urea into the exhaust gas; and
   a controller configured to suppress a HC desorption rate of the HC adsorption catalyst below a predetermined hydrogen cyanide concentration reference value in the exhaust gas flowing out from the urea adsorption type selective reduction catalyst.

2. The exhaust purification device as claimed in claim 1, wherein the controller is configured to suppress the HC desorption rate of the HC adsorption catalyst to an allowable HC adsorption value that is based on the hydrogen cyanide concentration reference value.

3. The exhaust purification device as claimed in claim 2, wherein the controller is configured to execute a temperature raising action in the HC adsorption catalyst when a HC adsorption a of the HC adsorption catalyst is less than the allowable HC adsorption value, the temperature raising action causing HC to desorb from the HC adsorption catalyst.

4. The exhaust purification device as claimed in claim 2, wherein the allowable HC adsorption value is a fixed value.

5. The exhaust purification device as claimed in claim 2, wherein the controller is configured to lower the HC adsorption value when an amount of urea adsorbed at the urea adsorption type selective reduction catalyst is increased.

6. The exhaust purification device as claimed in claim 3, wherein a temperature raising rate of the temperature raising action is lowered when the HC adsorption amount of the HC adsorption catalyst at the time of starting the temperature raising action of the HC adsorption catalyst is increased.

7. The exhaust purification device as claimed in claim 3, wherein the controller is configured to calculate the HC adsorption amount of the HC adsorption catalyst.

8. The exhaust purification device as claimed in claim 1, wherein
   a bypass passage bypassing the urea adsorption type selective reduction catalyst is branched off from the engine exhaust passage between the HC adsorption catalyst and the urea adsorption type selective reduction catalyst,
   the exhaust gas is sent into the urea adsorption type selective reduction catalyst when a concentration of HC in the exhaust gas flowing out from the HC adsorption catalyst is less than a predetermined allowable concentration, and
   the exhaust gas is sent into the bypass passage when the concentration of HC in the exhaust gas flowing out from the HC adsorption catalyst is greater than the predetermined allowable concentration.

9. The exhaust purification device as claimed in claim 1, wherein the urea feed valve is disposed downstream of the HC adsorption catalyst.

* * * * *